US010666536B1

(12) United States Patent
Gilbert et al.

(10) Patent No.: US 10,666,536 B1
(45) Date of Patent: May 26, 2020

(54) NETWORK ASSET DISCOVERY

(71) Applicant: Expanse, Inc., San Francisco, CA (US)

(72) Inventors: Connor Leete Gilbert, San Francisco, CA (US); Michael Haggblade, San Bruno, CA (US)

(73) Assignee: EXPANSE, INC., San Francisco, CA (US)

( * ) Notice: Subject to any disclaimer, the term of this patent is extended or adjusted under 35 U.S.C. 154(b) by 125 days.

(21) Appl. No.: 14/966,320

(22) Filed: Dec. 11, 2015

(51) Int. Cl.
*H04L 29/06* (2006.01)
*H04L 12/26* (2006.01)
*H04L 29/08* (2006.01)

(52) U.S. Cl.
CPC .............. *H04L 43/10* (2013.01); *H04L 63/20* (2013.01); *H04L 67/16* (2013.01); *H04L 29/06* (2013.01); *H04L 63/1433* (2013.01)

(58) Field of Classification Search
None
See application file for complete search history.

(56) References Cited

U.S. PATENT DOCUMENTS

| | | | | |
|---|---|---|---|---|
| 8,201,257 B1 * | 6/2012 | Andres | ................. | G06F 21/568 726/23 |
| 2005/0025157 A1 * | 2/2005 | Pennec | ............... | H04L 12/4641 370/395.5 |
| 2005/0154768 A1 * | 7/2005 | Theimer | ........... | H04L 29/12066 |
| 2009/0070237 A1 * | 3/2009 | Lew | ..................... | G06Q 10/087 705/28 |
| 2010/0151893 A1 * | 6/2010 | Yuasa | ................. | H04L 12/2809 455/507 |
| 2013/0321458 A1 * | 12/2013 | Miserendino | ....... | H04L 41/0883 345/629 |
| 2014/0007238 A1 * | 1/2014 | Magee | .................. | G06F 21/577 726/24 |
| 2014/0059216 A1 * | 2/2014 | Jerrim | .................... | H04L 67/104 709/224 |
| 2014/0298091 A1 * | 10/2014 | Carlen | .................... | H04L 65/80 714/15 |
| 2016/0112284 A1 * | 4/2016 | Pon | ........................ | H04L 43/045 709/224 |
| 2016/0373319 A1 * | 12/2016 | Littlejohn | ........... | H04L 41/5058 |

OTHER PUBLICATIONS

Author Unknown, Lumeta Launches IPsonar Product Integration Kit; Facilitates Sharing of Data Between Network Security and Network Management Tools to Improve Performance and Maximize Value., Business Wire, Jun. 7, 2004.
Author Unknown, Lumeta's IPsonar solution helps DoD map its computer networks, GSN Magazine, Jan. 13, 2010.

* cited by examiner

Primary Examiner — James A Edwards
(74) Attorney, Agent, or Firm — Perkins Coie LLP

(57) ABSTRACT

A system for detecting network assets or attributes related to a network entity includes an input interface and a processor. The input interface is to receive a seed. The seed is associated with the network entity. The processor is to determine a first set of network assets or attributes associated with the seed and to determine a second set of network assets or attributes based at least in part on the first set of assets or attributes.

38 Claims, 15 Drawing Sheets

INITIALIZATION

Network Identification - List

| Datum Type | Value | Reason |
|---|---|---|
| Entity Name | USPTO | Seed Data |
| Domain Name | uspto.gov | Seed Data |

Network Identification - Graph

Seed Data (Premises)
- Datum Entity Name: USPTO
- Datum Domain Name: uspto.gov

FIG. 7

RECURSIVE SUGGESTION

Network Identification - List

| Premise | Suggester | New Datum | Reason | Accept? |
|---|---|---|---|---|
| Entity Name: "USPTO" | Find new data based on Regional Internet Registry records that match the premises | Datum: ARIN Customer Handle "C00485***" | ARIN Record | Yes |
| Entity Name: "USPTO" | Find new data based on Regional Internet Registry records that match the premises | Datum: Street Address "***, Leesburg, VA 20176" | ARIN Record | Yes |
| Entity Name: "USPTO" | Find new data based on Regional Internet Registry records that match the premises | Datum: IP Range "198.92.193.*-198.92.193.*" | ARIN Record | Yes |

FIG. 8

RECURSIVE SUGGESTION

Network Identification - List

| Premise | Suggester | New Datum | Reason | Accept? |
|---|---|---|---|---|
| Datum (IP Range): 198.92.193.*-198.92.193.* | Find new domains based on an IP range | Datum: Subdomain "ITWIAM***.etc.uspto.gov" | Stateless active sensing | Yes |
| Datum (IP Range): 198.92.193.*-198.92.193.* | Find new domains based on an IP range | Datum: Domain "uspto.gov" | Stateless active sensing | Yes (redundancy detected) |
| Datum (IP Range): 198.92.193.*-198.92.193.* | Find new domains based on an IP range | Datum: Domain "realconn***.com" | Stateless active sensing | No (based on quality criteria) |

FIG. 11

RECURSIVE SUGGESTION

Network Identification - List

| Premise | Suggester | New Datum | Reason | Accept? |
|---|---|---|---|---|
| Datum (Domain Name): ITWIAM*.etc.uspto.gov | Find new IP ranges based on domains | Datum: IP range 151.*.*.*- 151.*.*.*** | Stateless active sensing | Yes |
| Datum (Domain Name): uspto.gov | Find new IP ranges based on domains | Datum: IP range 151.*.*.*- 151.*.*.* | Stateless active sensing | Yes |

FIG. 13

Continue until no suggester produces a new, non-redundant datum that is accepted — then process is complete.
△ Output may be any filtered data; filters may include de-duplication, limitations to a single or multiple datum types, etc.

Recursively Completed Network Identification (List)

| Datum Type | Value | Reason |
|---|---|---|
| Entity Name | USPTO | Seed Data |
| Domain Name | uspto.gov | Seed Data |
| ARIN Handle | C00485*** | ARIN suggester, Premise: "USPTO" Entity Name |
| IP Range | 198.92.193.*-198.92.193.* | ARIN suggester, Premise: "USPTO" Entity Name |
| Street Address | ***, Leesburg, VA 20176 | ARIN suggester, Premise: "USPTO" Entity Name |
| Domain Name | ITWIAM*.etc.uspto.gov | Domain suggester, Premise: IP Range 198.92.193.*-198.92.193.*** |
| Domain Name | uspto.gov | Domain suggester, Premise: IP Range 198.92.193.*-198.92.193.* |
| IP Range | 151.*.*.*-151.*.*.* | IP Range suggester, Premise: Domain Name ITWIAM***.etc.uspto.gov |
| ... | | |

Example Output: Unique IP Ranges

| Datum Type | Value | Reason |
|---|---|---|
| IP Range | 198.92.193.*-198.92.193.* | ARIN suggester, Premise: "USPTO" Entity Name |
| IP Range | 151.*.*.*-151.*.*.* | IP Range suggester, Premise: Domain Name ITWIAM***.etc.uspto.gov |
| IP Range | 66.63.17.*-66.63.17.* | IP Range suggester, Premise: ARIN Customer Handle C00486*** |
| ... | | |

FIG. 15

NETWORK ASSET DISCOVERY

BACKGROUND OF THE INVENTION

Today's networks grow or change in an organic fashion. Often the number and details of network assets associated with an entity is not known. Without knowing the extent of network assets it is difficult to manage, protect, or analyze the network assets of the entity.

BRIEF DESCRIPTION OF THE DRAWINGS

Various embodiments of the invention are disclosed in the following detailed description and the accompanying drawings.

FIG. 7 is a diagram illustrating an embodiment of an example output during a detection of network assets or attributes.

FIG. 8 is a diagram illustrating an embodiment of an example output during a detection of network assets or attributes.

FIG. 11 is a diagram illustrating an embodiment of an example output during a detection of network assets or attributes.

FIG. 13 is a diagram illustrating an embodiment of an example output during a detection of network assets or attributes.

FIG. 15 is a diagram illustrating an embodiment of an example output during detection of network assets or attributes.

DETAILED DESCRIPTION

Figure 1:
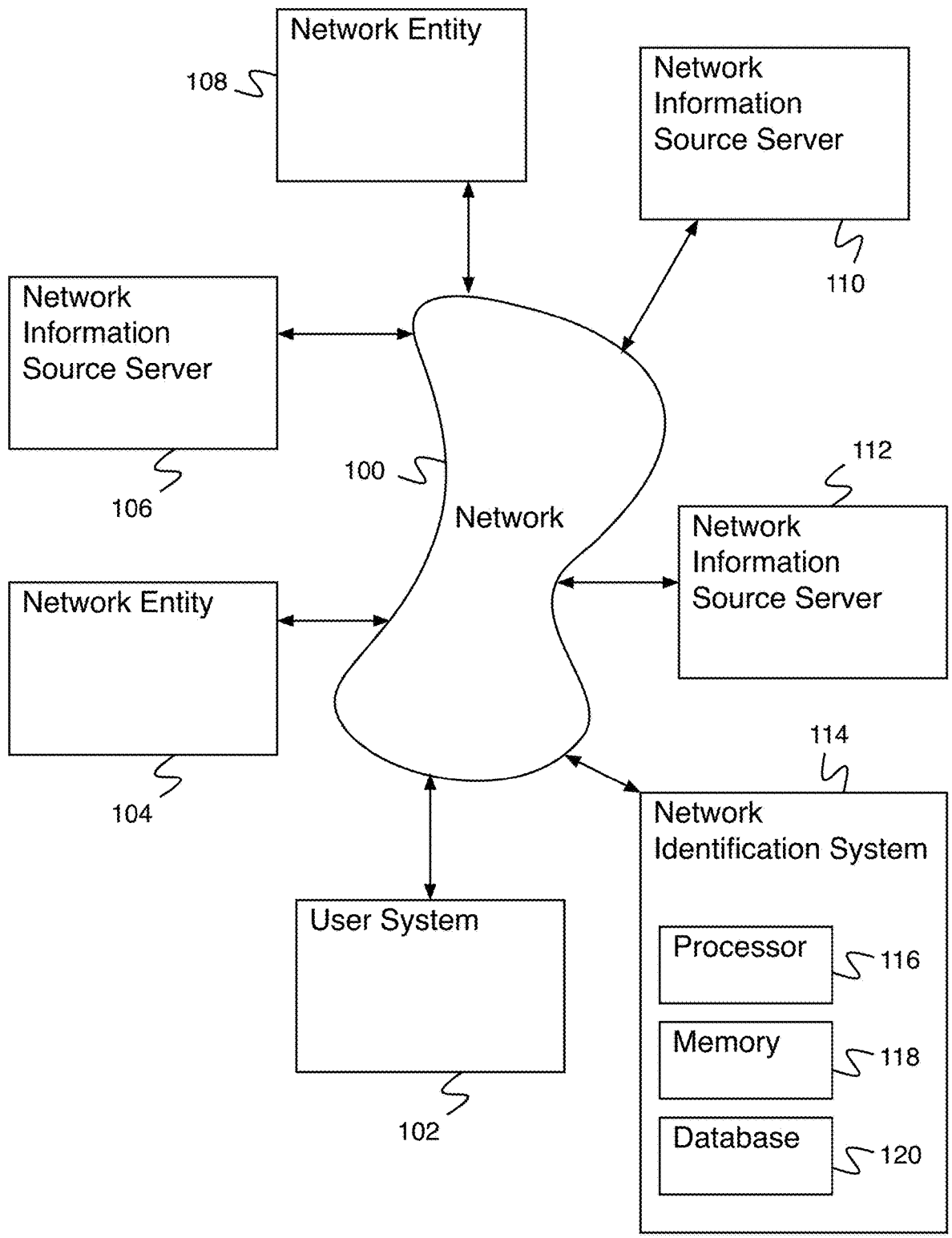
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for detecting network assets or attributes related to a network entity comprises an input interface to receive a seed, wherein the seed is associated with the network entity, and a processor to determine a first set of network assets or attributes associated with the seed, analyze the first set of network assets or attributes to extract a first set of attributes associated with the first set of network assets or attributes, and determine a second set of network assets or attributes based at least in part on the first set of attributes. In some embodiments, the system for detecting network assets or attributes comprises a memory coupled to the processor and configured to provide the processor with instructions.

In some embodiments, a system for detecting network assets or attributes comprises a system for identifying the network footprint of a network entity. The system for detecting network assets or attributes receives a seed associated with the network entity. In some embodiments, the seed comprises a network entity name and/or a network entity domain name. The system for detecting network assets or attributes determines a set of network assets or attributes associated with the network entity based at least in part on the seed. In various embodiments, network assets or attributes comprise internet protocol (e.g., IP) addresses, IP address ranges, domain names, company names, telephone numbers, physical addresses, mail exchanger server records, internet registry handles, autonomous systems, responses to network requests, serial numbers, hardware versions, software versions, firmware versions, hardware configurations, software configurations, firmware configurations, and any other appropriate network assets or attributes. In some embodiments, in order to detect all possible network assets or attributes associated with the network entity, an iterative process is used. In each step of the iterative process, one or more network asset or attribute suggesters of a set of network asset or attribute suggesters receive a set of network assets or attributes (e.g., the seed, previously determined network assets or attributes, etc.) and determine a new set of network assets or attributes. A conclusion is then made about the set of network assets or attributes, indicating whether it is determined that the network assets or attributes are relevant to the network entity. Network assets or attributes determined to be relevant are stored in a set of relevant network assets or attributes and provided to the network asset or attribute suggesters in further iterations of the process. In some embodiments, the process iterates until a fixed point has been reached (e.g., until no new relevant network assets or attributes are found by the network asset or attribute suggesters). In various embodiments, the network asset or attribute suggesters determine network assets or attributes based at least in part on a WHOIS service, regional Internet registry information, on domain name server (e.g., DNS) information, on certificate information, on cryptographic information, on autonomous system number information, on statistically distinguishable network asset response or configuration attributes, software version, firmware version, hardware version, unique identifying attributes of the asset's software, firmware, or hardware, or on any other appropriate information.

In some embodiments, a network asset or attribute evaluator makes a determination of the relevance of a network asset or attribute to the network entity. In some embodiments, the determination of the relevance of a network asset or attribute to the network entity is based at least in part on evidence provided by a network asset or attribute suggester. In various embodiments, the network asset or attribute evaluator comprises an automated network asset or attribute evaluator for automatically analyzing network assets or attributes and evidence and providing a determination of relevance, a manual (e.g., human) network asset or attribute evaluator for receiving a description of network assets or attributes and evidence and providing a determination of relevance, a combination of an automated and a manual network asset or attribute evaluator, or any other appropriate network asset or attribute evaluator. In some embodiments, a network asset or attribute evaluator provides a conclusion selected from the following: accept (e.g., the network asset is relevant to the network entity), reject (e.g., the network asset or attribute is not relevant to the network entity), or no decision (e.g., no action is taken). In some embodiments, in the event a network asset or attribute evaluator is provided with an identical decision to one it has made in the past, the network asset or attribute evaluator automatically repeats the previous decision without further consideration. In some embodiments, in the event the network asset or attribute evaluator is provided a network asset or attribute that has been previously accepted as relevant to the network entity, the network asset or attribute is automatically accepted without further consideration. In some embodiments, in the event the previous acceptance is reversed (e.g., by further evidence), a later automatic acceptance is provided again to the network asset evaluator for further consideration. In some embodiments, a network asset or attribute evaluator can leave a comment associated with the decision. In some embodiments, sub-networks of the network entity (e.g., separate organizational entities, separate locations, etc.) can be stored as separate divisions of the network entity within the set of relevant network assets or attributes. In some embodiments, in each iteration, only one network asset or attribute suggesters is used to determine new network assets or attributes. In some embodiments, after new relevant network assets or attributes have been found, a previously used network asset or attribute suggesters is used again to find further network assets or attributes based at least in part on the new relevant network assets or attributes.

In some embodiments, the seed associated with the network entity comprises an entity name. In some embodiments, the entity name is automatically transformed to replace characters other than letters or numbers with a wildcard character. In some embodiments, abbreviations are automatically removed from the entity name. In some embodiments, words likely to be abbreviated are automatically removed from the name. In some embodiments, the seed comprises multiple entity names. In some embodiments, the seed associated with the network entity comprises an entity domain name. In some embodiments, the entity domain name is automatically transformed into a most general form of the domain name (e.g., example.com as opposed to www.example.com; leading characters such as http:// are removed; trailing subdirectories such as/anything are removed). In some embodiments, one or more portions of the domain name are automatically replaced with a wildcard character.

In some embodiments, a network asset or attribute suggester determines network assets or attributes based at least in part on a WHOIS service. In some embodiments, a WHOIS service comprises a network information source server for providing information about IP ranges and autonomous system numbers. In some embodiments, network asset or attribute suggesters that determine network assets or attributes based at least in part on a WHOIS service use wildcard patterns (e.g., wildcard patterns of IP ranges and autonomous system numbers). Network asset or attribute suggesters that determine network assets or attributes based at least in part on a WHOIS service using wildcard patterns provide internet registry handles in response. In some embodiments, network asset or attribute suggesters that determine network assets or attributes based at least in part on a WHOIS service use internet registry handles. Network asset or attribute suggesters that determine network assets or attributes based at least in part on a WHOIS service using internet registry handles provide network entity names, domains, phone numbers, addresses, IP ranges, and/or other internet registry handles.

In some embodiments, a network asset or attribute suggester determines network assets or attributes based at least in part on DNS information. In various embodiments, a network asset or attribute suggester determining network assets or attributes based at least in part on DNS information uses domain names to find IP addresses or other domains; uses IP ranges to find DNS entries; uses DNS entries to find related DNS entries; extracts domain names from other data; or determines network assets or attributes based at least in part on DNS information in any other appropriate way.

In some embodiments, a network asset or attribute suggester determines network assets or attributes based on certificate information or cryptographic information. In various embodiments, a network asset or attribute suggester determining network assets or attributes based on certificate information or cryptographic information finds certificates and other appropriate cryptographic information in known IP ranges; takes certificate or other appropriate cryptographic information fields (e.g., manually or automatically entered data into certificate fields) from known IP ranges; finds places where individual known certificates or other appropriate cryptographic information have been observed in global scan data; finds certificates or other appropriate cryptographic information from other fields (e.g., looks up certificates based on data entered in certificate fields); or determines network assets or attributes based on certificate information or other appropriate cryptographic information in any other appropriate way.

In some embodiments, a network asset or attribute suggester determines network assets or attributes based on autonomous system number information. In various embodiments, a network asset or attribute suggester determining network assets or attributes based on autonomous system number information receives an IP range and provides an autonomous system number that claims to serve the IP range; uses a WHOIS service to determine an internet registry handle based at least in part on an IP range and determines an autonomous system number based at least in part on the internet registry handle; receives an individual IP address and determines the enclosing range and the autonomous system number that serves them; receives an autonomous system number and determines the IP address ranges that it claims to serve; or determines network assets or attributes based on autonomous system number information in any other appropriate way.

FIG. 1 is a block diagram illustrating an embodiment of a network system. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. In the example shown, network entity 104 and network entity 108 communicate with network 100. In various embodiments, a network entity comprises a business network entity, a university network entity, a government network entity, an organization network entity, a private user network entity, an internet service provider, or any other appropriate network entity. In some embodiments, a network entity communicates with network 100 via two or more connections (e.g., network entity 104 and network entity 108 comprise the same network entity). In various embodiments, network 100 communicates with 1, 2, 4, 9, 15, 77, 121, 1022, 1053247, or any other appropriate number of network entities. In various embodiments, a network entity comprises 1, 2, 3, 5, 7, 8, 22, 55, 119, 1025, or any other appropriate number of systems communicating with network 100. User system 102 comprises a user system for communicating with network 100. In various embodiments, a user using user system 102 communicates with network entity 104, with network information source server 106, or with network identification system 114. In some embodiments, a user using user system 102 desires to learn information about a network entity (e.g., IP addresses, IP address ranges, domain names, company names, telephone numbers, physical addresses, mail exchanger server records, internet registry handles, autonomous systems, etc.). In some embodiments, user system 102 communicates with network identification system 114 to learn information about a network entity. In some embodiments, network identification system 114 communicates with a network information source server (e.g., network information source server 106, network information source server 110) for learning information about a network entity. Network information source server 106 and network information source server 110 comprise network information source servers (e.g., WHOIS servers, DNS servers, etc.). In some embodiments, network information source servers provide information about network entities in response to queries (e.g., providing an IP address in response to a domain name query, providing a registrant name and address in response to a domain name query, etc.). Network identification system 114 comprises a network identification system for determining information about a network entity. In some embodiments, network identification system 114 receives information from one or more network information source servers. In some embodiments, network identification system determines information from its stored database (e.g., database 120). In some embodiments, network identification system 114 iteratively determines network information (e.g., repeatedly executes a process to determine new network information based on known network information until no new network information is found). In some embodiments, network identification system 114 iteratively determines network information in response to a seed (e.g., a network entity name, a network entity domain name, etc.) provided by a user via a user system. In the example shown, network identification system 114 comprises processor 116 for processing data. Network identification system 114 additionally comprises memory 118 coupled to processor 116 and configured to provide processor 116 with instructions. Network identification system 114 additionally comprises database 120. In various embodiments, database 120 comprises a database for storing WHOIS information, for storing DNS information, for storing autonomous system information, for storing certificate information, or for storing any other appropriate information. In some embodiments, network identification system 114 comprises a system for automatically querying a set of network entities (e.g., network entity 104) for network information and storing the network information in database 120. In some embodiments, network identification system 114 queries all available network entities for network information.

Figure 2:
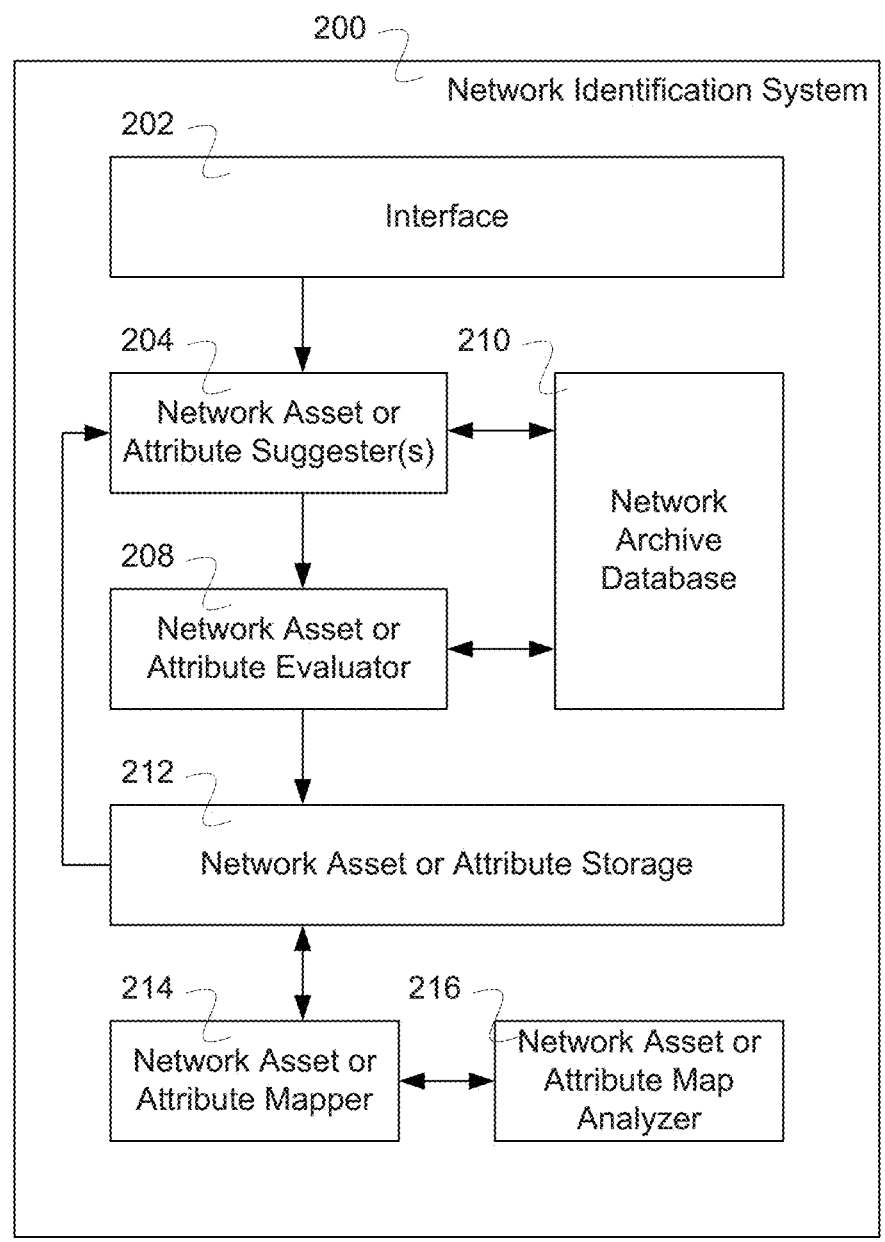
FIG. 2 is a block diagram illustrating an embodiment of a network identification system.

FIG. 2 is a block diagram illustrating an embodiment of a network identification system. In some embodiments, network identification system 200 of FIG. 2 comprises network identification system 114 of FIG. 1. In the example shown, network identification system 200 comprises interface 202. In some embodiments, interface 202 comprises an input interface for receiving a seed associated with a network entity (e.g., a network entity name, a network entity domain name, etc.). In some embodiments, interface 202 comprises an input interface for receiving a set of expected network assets. Network asset or attribute suggester(s) 204 comprise a set of network asset or attribute suggesters for determining a set of network assets or attributes based at least in part on a seed and/or a previous set of network assets or attributes. In some embodiments, each network asset or attribute suggester of network asset or attribute suggesters 204 comprises a network asset or attribute suggester using a different strategy for determining network assets or attributes (e.g., a WHOIS based network asset or attribute suggester, a DNS based network asset or attribute suggester, a network asset or attribute suggester for determining certificate fields from IP ranges, a network asset or attribute suggester for determining certificates from certificate fields, etc.). In some embodiments, a network asset or attribute suggester of network asset or attribute suggesters 204 communicates with one or more network information source server (e.g., network information source server 106 of FIG. 1, network information source server 110 of FIG. 1, etc.) for determining network assets or attributes. In some embodiments, a network asset or attribute suggester of network asset or attribute suggesters 204 communicates with network archive database 210 for determining network assets or attributes. In some embodiments, attributes comprise network data. Network asset or attribute evaluator comprises a network asset or attribute evaluator for evaluating network assets or attributes. In some embodiments, network asset or attribute evaluator 208 comprises a network asset or attribute evaluator for determining whether network assets or attributes determined by network asset or attribute suggesters 204 comprise network assets or attributes relevant to the network entity (e.g., the network entity associated with the seed). In some embodiments, network asset or attribute evaluator 208 comprises a network asset or attribute evaluator for determining whether previously determined network assets or attributes are relevant to the network entity based at least in part on assets or attributes determined from network assets or attributes. In some embodiments, network asset or attribute evaluator 208 comprises an automatic network asset or attribute evaluator (e.g., a network asset or attribute evaluator that evaluates network assets or attribute without interaction with a network identification system user). In some embodiments, network asset or attribute evaluator 208 comprises a manual network asset or attribute evaluator (e.g., a network asset or attribute evaluator that facilitates network asset or attribute evaluating by a network identification system user). Network archive database 210 comprises a database for storing previously collected network information for use in determining, analyzing, or evaluating network assets. In the example shown, network assets or attributes determined (e.g., by network asset or attribute evaluator 208) to be relevant to the network entity are stored in network asset or attribute storage 212. Network asset or attribute mapper 214 comprises a network asset or attribute mapper for creating a map of relevant network assets or attributes. Network asset or attribute map analyzer 216 comprises an analyzer for analyzing the map of relevant network assets or attributes. In some embodiments, analyzing the map of relevant network assets or attributes comprises comparing the map of relevant network assets or attributes to a map of expected network assets or attributes.

Figure 3:
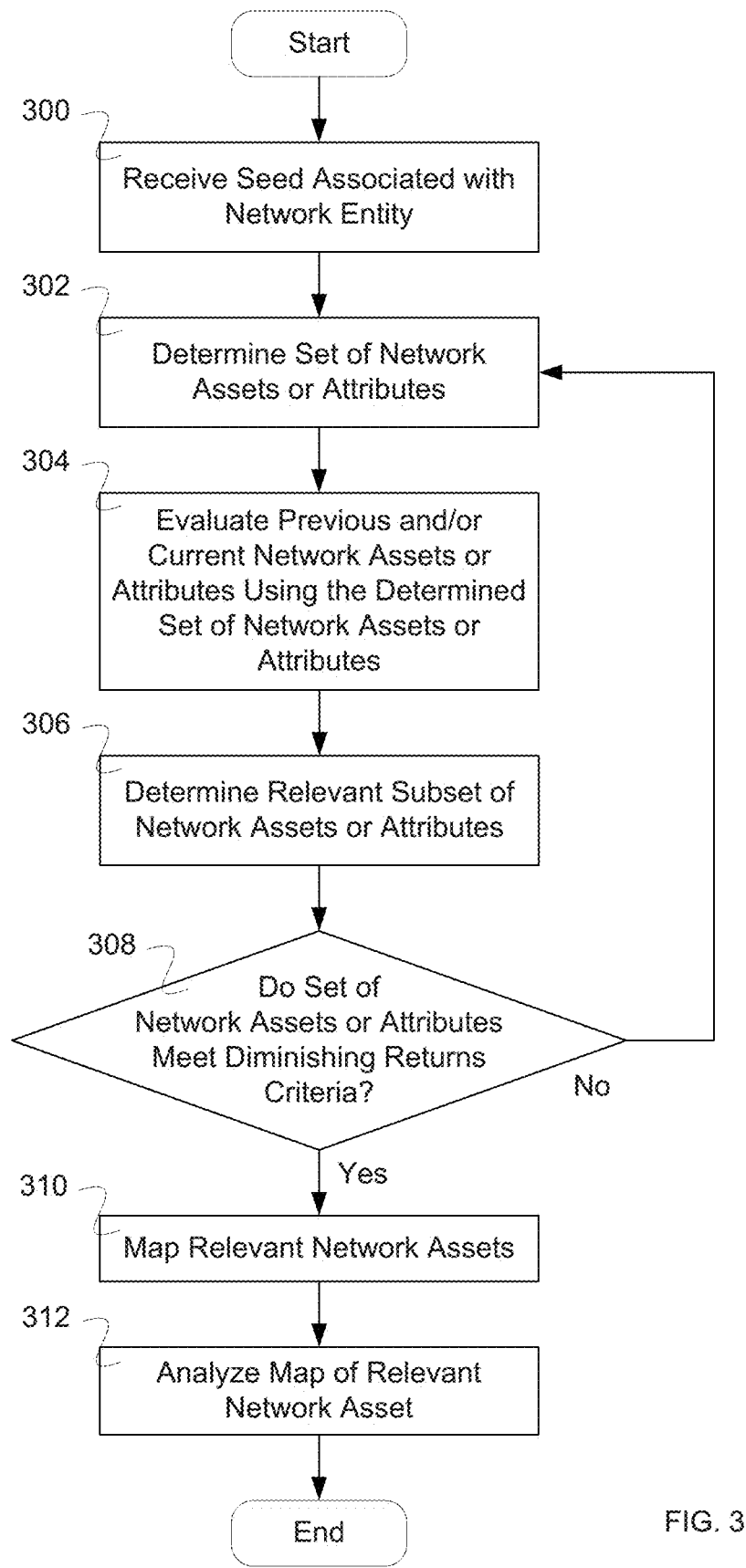
FIG. 3 is a flow diagram illustrating an embodiment of a process for detecting network assets or attributes related to a network entity.

FIG. 3 is a flow diagram illustrating an embodiment of a process for detecting network assets or attributes related to a network entity. In some embodiments, the process of FIG. 3 is executed by network identification system 114 of FIG. 1. In the example shown, in 300, a seed is received associated with a network entity. In various embodiments, the seed comprises a network entity name, a network entity domain name, or any other appropriate network entity information. In some embodiments, the seed is received from a user using a user system. In some embodiments, a set of expected network assets is received. In 302, a set of network assets or attributes is/are determined. In various embodiments, network assets or attributes comprise internet protocol (e.g., IP) addresses, IP address ranges, domain names, company names, telephone numbers, physical addresses, mail exchanger server records, internet registry handles, autonomous systems, network service responses, serial numbers, and any other appropriate network assets or attributes. In some embodiments, the set of network assets or attributes is/are determined by one or more network asset or attribute suggesters. In some embodiments, the set of network assets or attributes comprises a first set of network assets or attributes associated with the seed. In some embodiments, the set of network assets or attributes comprises a second set of network assets or attributes associated with a first set of assets or attributes. In some embodiments, the set of network assets or attributes comprises a second set of network assets or attributes with a relationship with a first set of assets or attributes. In various embodiments, the relationship comprises one or more of the following: "is owned by", "was previously owned by", "is manufactured by", "is maintained by", "was previously maintained by", "is operated on behalf of", "is associated with", "was previously associated with", has configuration parameters or software versions identical or similar to", "has displayed configuration parameters or software versions identical or similar to", or any other appropriate relationship. In various embodiments, the set of network assets is analyzed to determine a set of attributes or vice versa or in any other appropriate order. In some embodiments, the first set of network assets is analyzed to extract a first set of attributes associated with the first set of network assets. In some embodiments, the second set of network assets is analyzed to extract a second set of attributes associated with the second set of network assets. In 304, previous and or current sets of network assets or attributes are evaluated using the determined set of assets or attributes. In some embodiments, evaluating a set of assets or attributes comprises determining the relevance of each asset or attribute of the set of assets or attributes to the network entity. In 306, a relevant subset of the set of network assets or attributes is determined. In 308, it is determined whether the network assets or attributes meet a diminishing returns criterion. In some embodiments, it is determined whether the network assets or attributes meet multiple diminishing returns criteria simultaneously. In some embodiments, the network assets or attributes meet a diminishing returns criterion in the event no network assets or attributes are found (e.g., in 302) and/or determined to be relevant (e.g., in 306). In the event it is determined that the network assets or attributes do not meet the diminishing returns criterion, control passes to 302. In various embodiments, diminishing returns criteria are constructed singly or composed jointly based on statistical measures including receiver operating characteristic curves, total number of network assets or attributes identified, minimum number of network assets or attributes sought for identification, statistical diversity of quantitative or categorical attributes, and any other appropriate statistical measures. In some embodiments, time stamps associated with network assets or attributes are used to produce a diminishing returns criterion bounded in time. In various embodiments, a diminishing returns criteria comprises no new data detected, some threshold percentage of data already previously determined (e.g., 80% previously detected), a data on a stop list (e.g., a common resource—for example, amazon cloud service, etc.). In the event it is determined that the network assets or attributes meet the diminishing returns criterion, control passes to 310. In 310, the relevant network assets or attributes are mapped. For example, the relevant network assets or attributes are mapped by inclusion via transfer or copying to a single map data storage unit, by added markings indicating the presence of a relationship or multiple relationships to other maps, or by inclusion in a visual representation of all of the relevant network assets or attributes or certain subsets of the relevant network assets or attributes. In 312, the map of relevant network assets or attributes is analyzed. In various embodiments, the analysis of the map includes the production of statistical measures such as counts of network assets or attributes of a particular type, the number or character of suggestions resulting in the concordant conclusions regarding a given network asset or attribute, the number or character of suggestions resulting in discordant conclusions regarding a given network asset or attribute, the number or character of network assets or attributes present in the map associated with a particular type of suggestor result, comparison between the number, character, or counts of network assets or attributes on the map and a single map or multiple maps produced through similar means with different source data or diminishing returns criteria, comparison between the number, character, or counts of network assets or attributes on the map and a single or multiple maps produced through different means in a format substantially similar to the map, or any other appropriate analyses.

Figure 4:
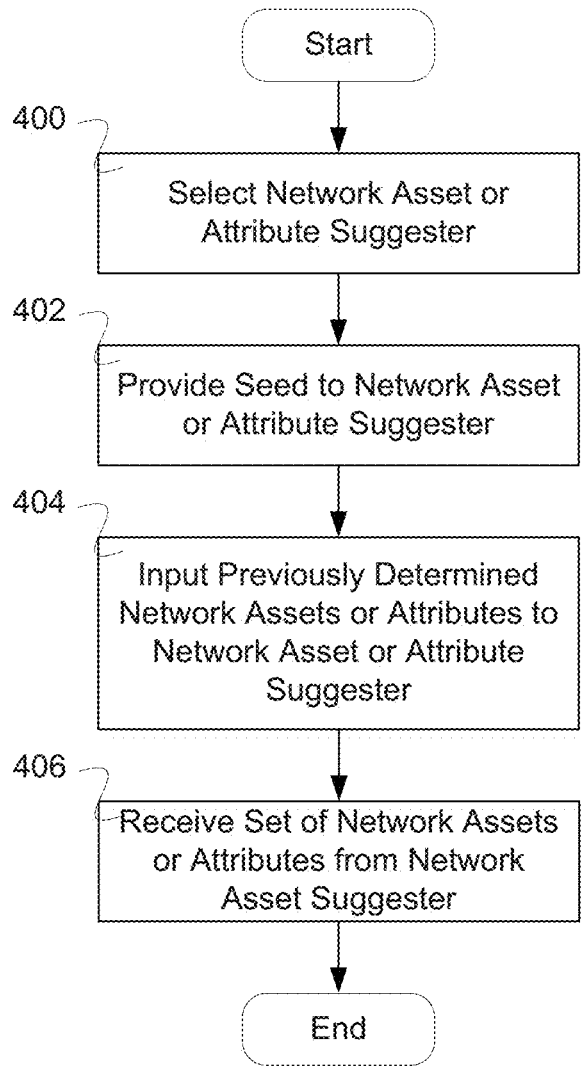
FIG. 4 is a flow diagram illustrating an embodiment of a process for determining a set of network assets or attributes.

FIG. 4 is a flow diagram illustrating an embodiment of a process for determining a set of network assets or attributes. In some embodiments, the process of FIG. 4 implements 302 of FIG. 3. In the example shown, in 400, a network asset or attribute suggester is selected. In some embodiments, a confidence probability is used to determine a network asset or attribute and/or network asset or attribute suggester to follow. For example, a confidence probability is higher for a datum in the event that the datum is older, is newer, is unique, is less common, etc. In some embodiments, the network asset or attribute suggester comprises a network asset or attribute suggester of a set of network asset or attribute suggesters. In some embodiments, two or more network asset or attribute suggesters are selected. In 402, a seed (e.g., the seed received in 300 of FIG. 3) is provided to the network asset or attribute suggester. In 404, previously determined network assets or attributes (e.g., network assets or attributes determined to be relevant to the network entity in previous iterations of the loop of FIG. 3) are input to the network asset or attribute suggester. In 406, a set of network assets or attributes is received from the network asset or attribute suggester.

Figure 5:
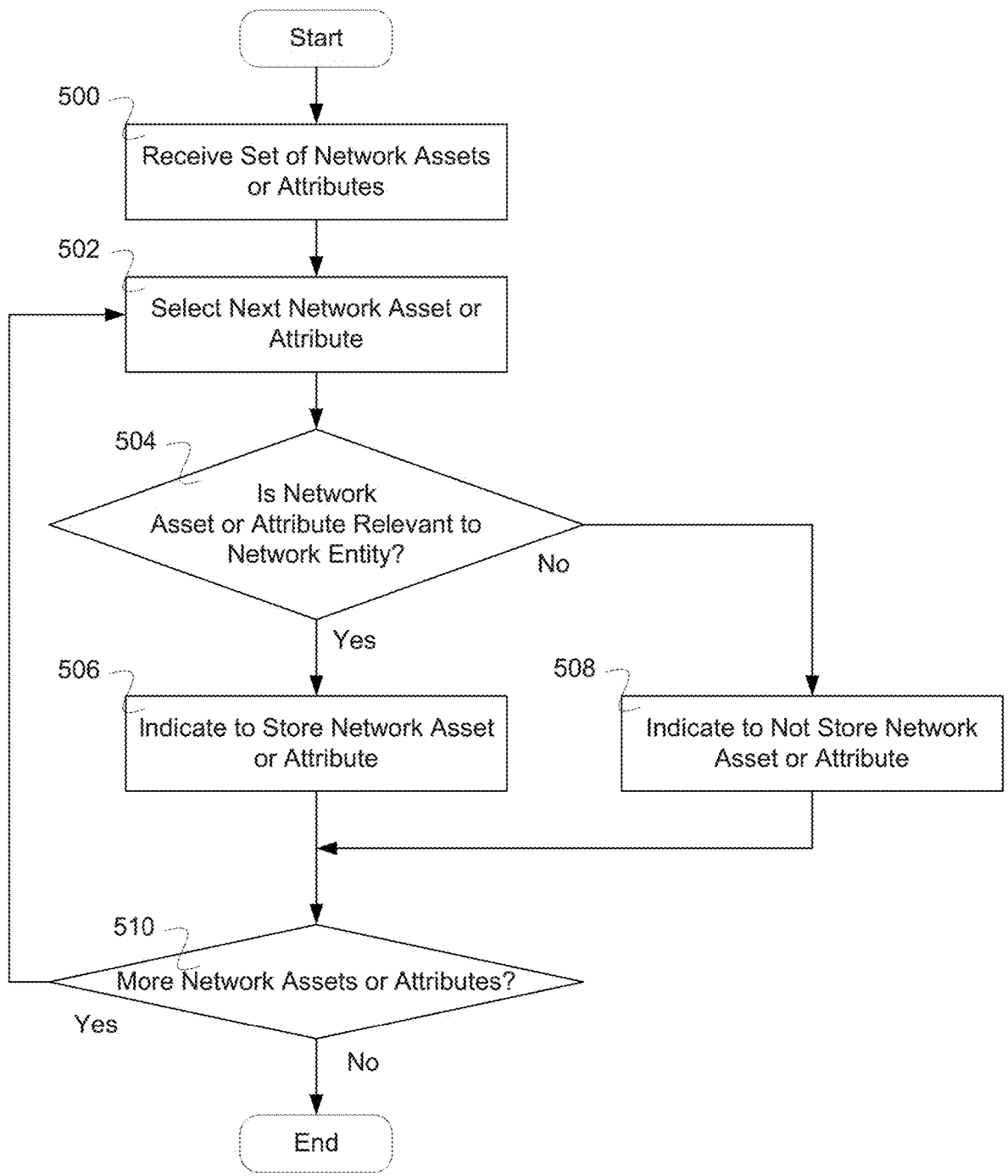
FIG. 5 is a flow diagram illustrating an embodiment of a process for determining a relevant subset of the set of network assets or attributes.

FIG. 5 is a flow diagram illustrating an embodiment of a process for determining a relevant subset of the set of network assets or attributes. In some embodiments, the process of FIG. 5 implements 306 of FIG. 3. In the example shown, in 500, a set of network assets or attributes is received. In 502, the next network asset or attribute (e.g., of the set of network assets or attributes) is selected. In some embodiments, the first network asset or attribute is selected. In 504, it is determined whether the network asset or attribute is relevant to the network entity. In some embodiments, it is determined automatically whether the network asset or attribute is relevant to the network entity (e.g., by comparing the network asset or attribute to a set of expected network assets or attributes, by comparing the network asset or attribute to a blacklist of network assets or attributes, by comparing a quantity of evidence to a threshold, using machine learning, or in any other appropriate way). In some embodiments, it is determined manually whether the network asset or attribute is relevant to the network entity (e.g., by presenting the network asset or attribute and/or associated evidence to a user using a user system and receiving an indication of relevance from the user). In the event it is determined that the network asset or attribute is relevant to the network entity, control passes to 506. In the event it is determined that the network asset or attribute is not relevant to the network entity, control passes to 508. In 508, it is indicated to not store the network asset or attribute. Control then passes to 510. In 506, it is indicated to store the network asset or attribute. Control then passes to 510. In 510, it is determined whether there are more network assets or attributes. In the event it is determined that there are more network assets or attributes, control passes to 502. In the event it is determined that there are not more network assets or attributes, the process ends.

Figure 6:
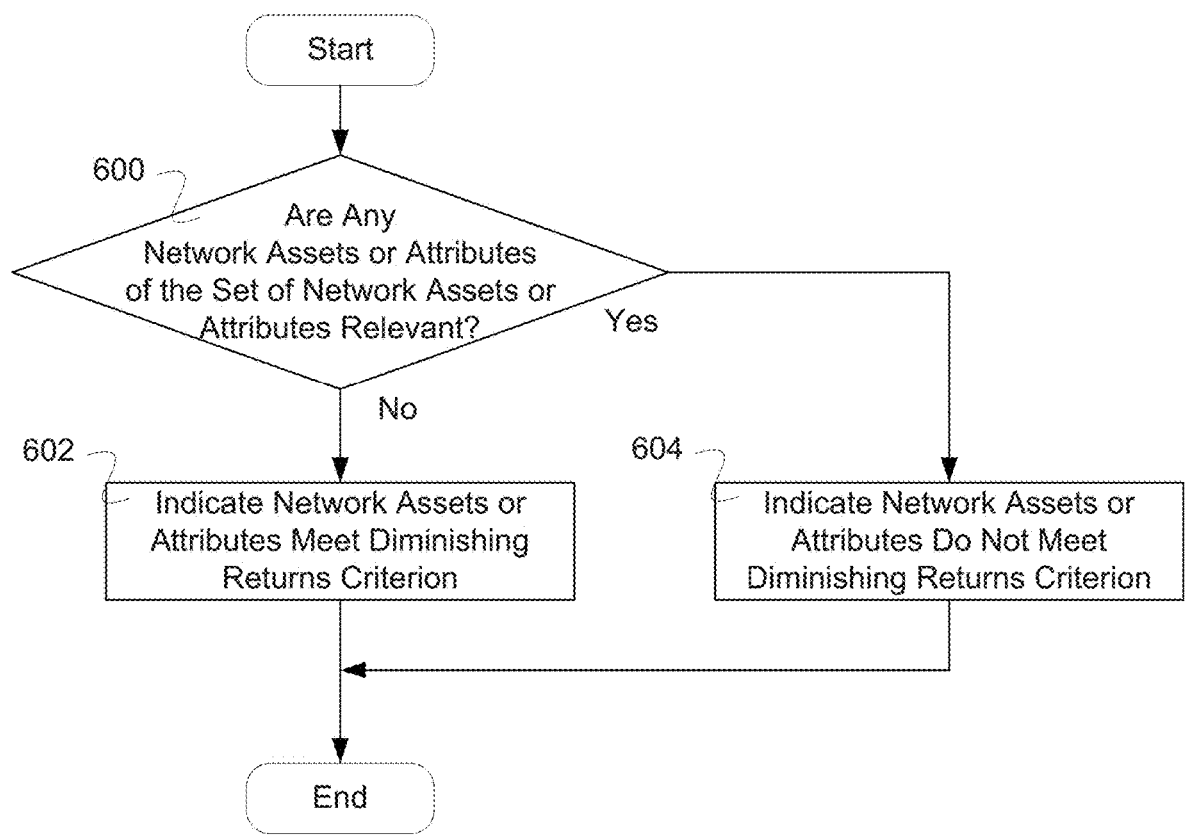
FIG. 6 is a flow diagram illustrating an embodiment of a process for determining whether a set of network assets or attributes meets a diminishing returns criterion.

FIG. 6 is a flow diagram illustrating an embodiment of a process for determining whether a set of network assets or attributes meets a diminishing returns criterion. In some embodiments, the process of FIG. 6 implements 308 of FIG. 3. In the example shown, in 600, it is determined whether any network assets or attributes of the set of network assets or attributes are relevant (e.g., were determined to be relevant, e.g., in 306 of FIG. 3). In the event it is determined that no network assets or attributes are relevant, control passes to 602. In 602, it is indicated that the network assets or attributes meet a diminishing returns criterion, and the process ends. In the event it is determined that one or more network assets or attributes are relevant in 600, control passes to 604. In 604, it is indicated that the network assets or attributes do not meet a diminishing returns criterion.

FIG. 7 is a diagram illustrating an embodiment of an example output during a detection of network assets or attributes. In the example shown, the session is initialized. A Network Identification (Graph) and a Network Identification (List) are shown. The Network Identification (Graph) includes Seed Data (Premises) of Datum (Entry Name): USPTO (e.g., a network entity) and Datum (Domain Name): uspto.gov. Network identification (List) includes a table with three columns: Datum Type, Value, and Reason with two rows of data: 1) Entity Name, USPTO, and Seed Data; and 2) Domain Name, uspto.gov, and Seed Data. In some embodiments, a seed is provided to start the detection of network assets or attributes associated with a network entity.

FIG. 8 is a diagram illustrating an embodiment of an example output during a detection of network assets or attributes. In the example shown, a recursive suggestion table is provided. The table includes columns: premise, suggester, new Datum, reason, accept? The table includes three rows: 1) Entity Name: "USPTO", Find new data based on Regional Internet Registry records that match the premises, Datum: AKIN Customer Handle "C00485*", ARIN Record, Yes; 2) Entity Name: "USPTO", Find new data based on Regional Internet Registry records that match the premises, Datum: Street Address "*, Leesburg, VA 20176", ARIN Record, Yes; and 3) Entity Name: "USPTO", Find new data based on Regional Internet Registry records that match the premises, Datum: IP Range "198.92.193.*-198.92.193.*", ARIN Record, Yes. In some embodiments, a suggester provides network assets or attributes based at least in part on the seed information.

Figure 9:
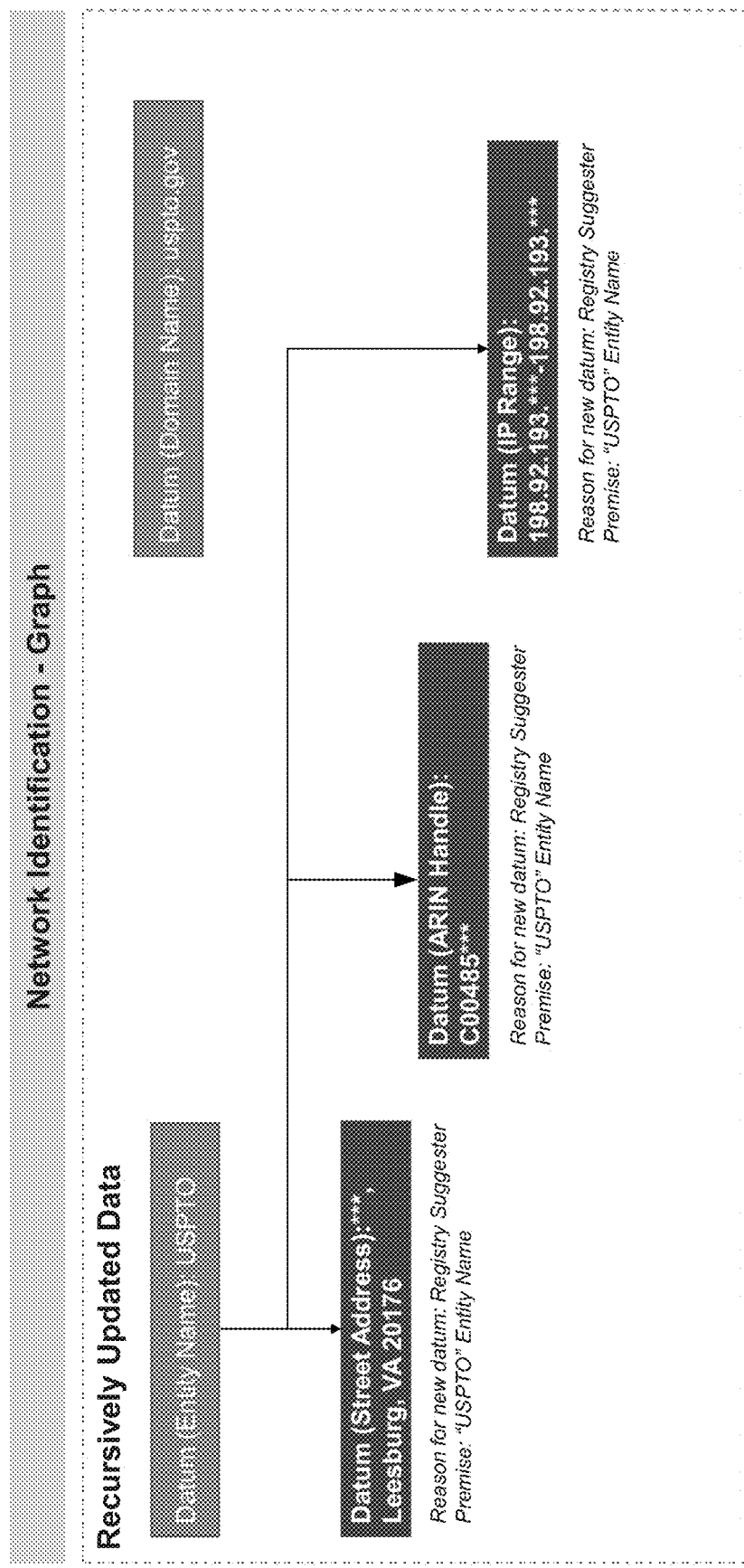
FIG. 9 is a diagram illustrating an embodiment of an example output during detection of network assets or attributes.

FIG. 9 is a diagram illustrating an embodiment of an example output during detection of network assets or attributes. In the example shown, an update of a Network Identification (Graph) is provided. The Network Identification (Graph) includes recursively updated data: Datum (Entity Name): USPTO that points to Datum (Street Address): "*, Leesburg, VA 20176", Datunm (ARIN Handle): C00485*, and Datum (IP Range): 198.92.193.*-198.92.193.*. Each Datum has a reason for being added. Datum (Street Address) has Reason for new datum: Registry Suggester, Premise: "UPSTO" Entity Name; Datum (ARIN Handle) has reason for new datum: Registry Suggester, Premise: "USPTO" Entity Name; and Datum (IP Range): 198.92.193.*-198.92.193.*. The Network Identification (Graph) includes recursively updated data: Datum (Domain Name): uspto.goc does not point to any other data.

Figure 10:
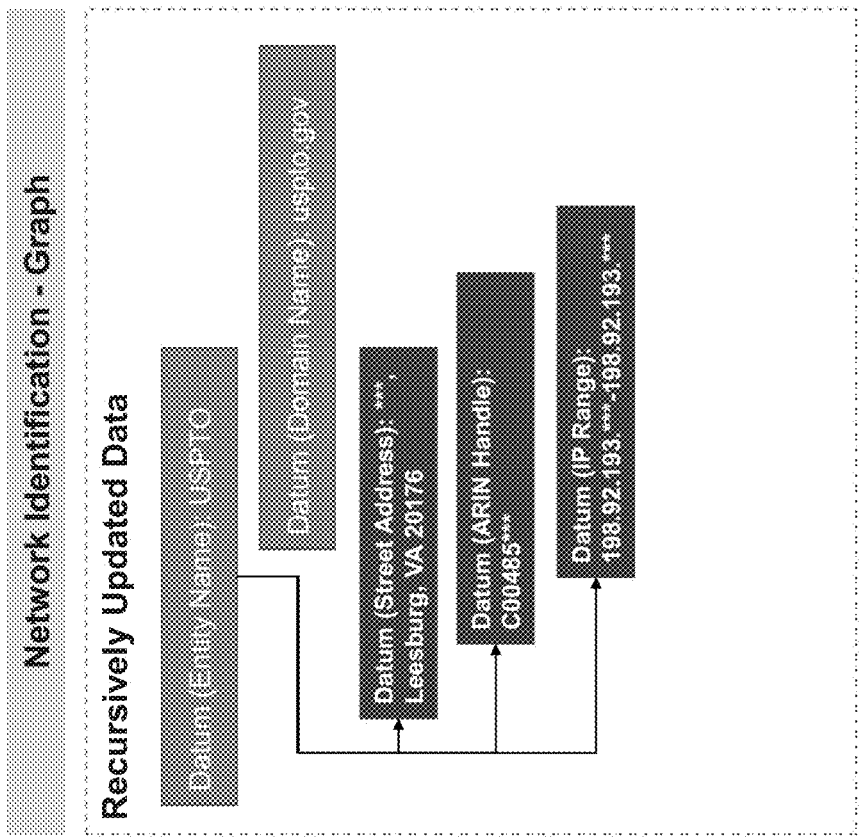
FIG. 10 is a diagram illustrating an embodiment of an example output during detection of network assets or attributes.

FIG. 10 is a diagram illustrating an embodiment of an example output during detection of network assets or attributes. In the example shown, an update of a Network Identification (Graph) and Network Identification (List) are provided. The Network Identification (Graph) includes recursively updated data: Datum (Entity Name): USPTO that points to Datum (Street Address): "*, Leesburg, VA 20176", Datunm (ARIN Handle): C00485*, and Datum (IP Range): 198.92.193.*-198.92.193.*. The Network Identification (Graph) includes recursively updated data: Datum (Domain Name): uspto.goc, which does not point to any other data. Network Identification (List) table include three columns: Datum Type, Value, and Reason. The table includes five data rows: 1) Entity Name, USPTO, Seed Data; 2) Domain Name, uspto.gov, Seed Data; 3) ARIN Handle, C00485*, Registry Suggester, Premise: "USPTO" Entity Name; 4) IP Range 198.92.193.*-198.92.193.*, Registry Suggester, Premise: "USPTO" Entity Name; and 5) Street Address, "*, Leesburg, VA 20176, Registry Suggester, Premise "USPTO" Entity Name. In some embodiments, a graph and list display assets and attributes detected associated with an input seed. In the display shown in FIG. 10, a first set of detected assets or attributes are indicated in the graph by the arrows and in the list by an indication in a reason column by a suggester name.

FIG. 11 is a diagram illustrating an embodiment of an example output during a detection of network assets or attributes. In the example shown, a recursive suggestion table is provided. The table includes columns: premise, suggester, new Datum, reason, accept? The table includes three rows: 1) Datum (IP Range): 198.92.193.*-198.92.193.*, Find new domains based on an IP Range, Datum: Subdomain "ITWIAM*.etc.uspto.gov", Stateless active sensing, Yes; 2) Datum (IP Range): 198.92.193.*-198.92.193.*, Find new domains based on an IP Range, Datum: Doman "uspto.gov", Stateless active sensing, Yes (redundancy detected); and 3) Datum: Street Address "*, Leesburg, VA 20176", ARIN Record, Yes; and 3) Datum (IP Range): 198.92.193.*-198.92.193.*, Find new domains based on an IP Range, "realconn***.com", Stateless active sensing, No (based on quality criteria). In some embodiments, assets or attributes previously determined are used by suggester to discover a next set of assets or attributes.

Figure 12:
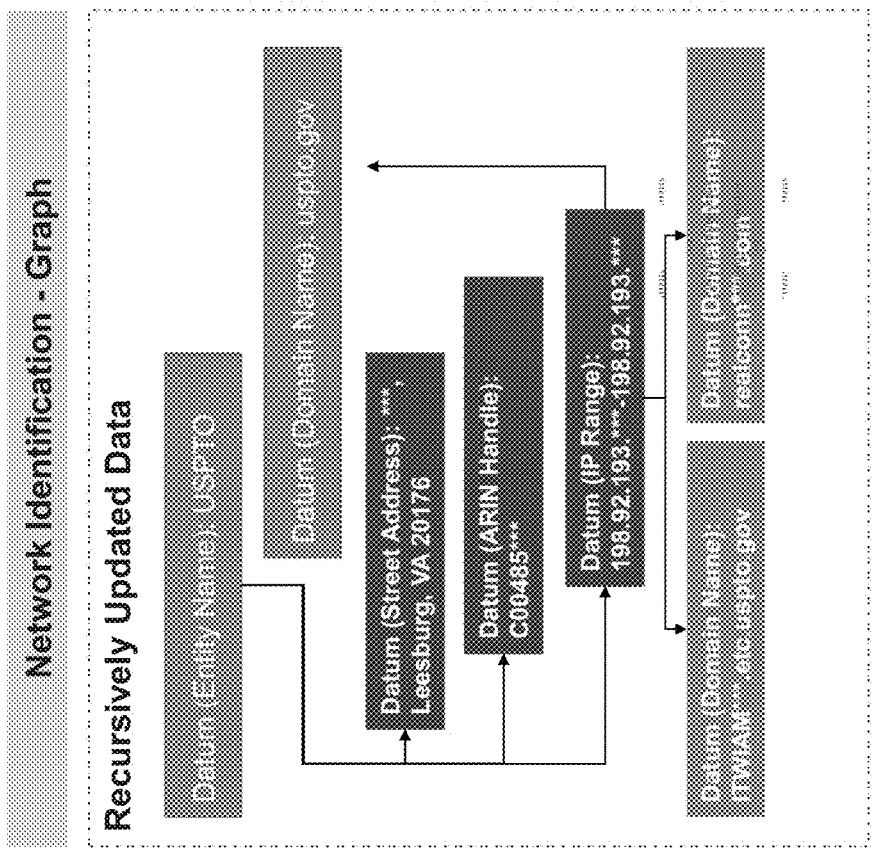
FIG. 12 is a diagram illustrating an embodiment of an example output during detection of network assets or attributes.

FIG. 12 is a diagram illustrating an embodiment of an example output during detection of network assets or attributes. In the example shown, an update of a Network Identification (Graph) and Network Identification (List) are provided. The Network Identification (Graph) includes recursively updated data: Datum (Entity Name): USPTO that points to Datum (Street Address): "*, Leesburg, VA 20176", Datunm (ARIN Handle): C00485*, and Datum (IP Range): 198.92.193.*-198.92.193.*. Datum (IP Range): 198.92.193.*-198.92.193.* points to Datum (Domain Name): ITWIAM*.etc.uspto.gov and has a x-ed out Datum (Domain Name): realconn*.com. The Network Identification (Graph) includes recursively updated data: Datum (Domain Name): uspto.gov, which is pointed to from Datum (IP Range): 198.92.193.*-198.92.193.*. Network Identification (List) table include three columns: Datum Type, Value, and Reason. The table includes seven data rows: 1) Entity Name, USPTO, Seed Data; 2) Domain Name, uspto.gov, Seed Data; 3) ARIN Handle, C00485*, Registry Suggester, Premise: "USPTO" Entity Name; 4) IP Range 198.92.193.*-198.92.193.*, Registry Suggester, Premise: "USPTO" Entity Name; 5) Street Address, "*, Leesburg, VA 20176, Registry Suggester, Premise "USPTO" Entity Name; 6) Domain Name, ITWAIM*.etc.uspto.gov, Domain suggester, Premise: IPRange 198.92.193.*-198.92.193; and 7) Domain Name, uspto.gov, Domain suggester, Premise: IPRange 198.92.193.***-198.92.193. In some embodiments, a graph and list display assets and attributes detected associated with an input seed or detected assets or attributes. In the display shown in FIG. 12, a first and second set of detected assets or attributes are indicated in the graph by the arrows and in the list by an indication in a reason column by a suggester name.

Figure 14:
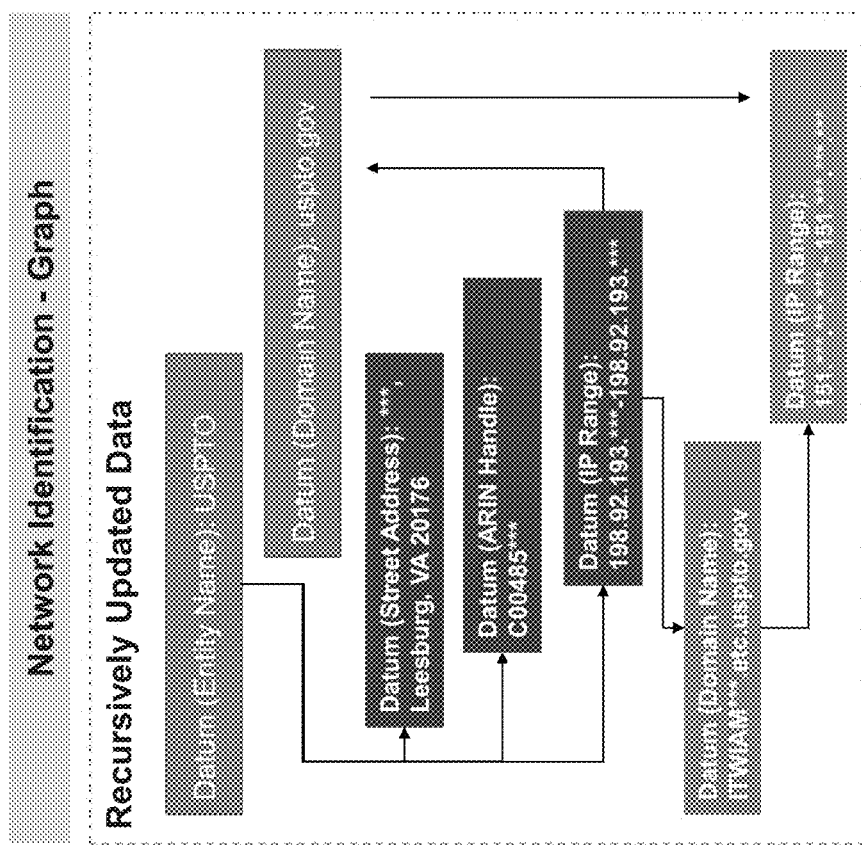
FIG. 14 is a diagram illustrating an embodiment of an example output during detection of network assets or attributes.

FIG. 13 is a diagram illustrating an embodiment of an example output during a detection of network assets or attributes. In the example shown, a recursive suggestion table is provided. The table includes columns: premise, suggester, new Datum, reason, accept? The table includes two rows: 1) Datum (Domain Name): ITWIAM*.etc.uspto.gov, Find new IP ranges based on domains, Datum: IP range 151.*.*.*-151.*.*.*, Stateless active sensing, Yes; and 2) Datum (Domain Name): uspto.gov, Find new IP ranges based on domains, Datum: IP range 151.*.*.*-151.*.*.***, Stateless active sensing, Yes;

FIG. 14 is a diagram illustrating an embodiment of an example output during detection of network assets or attributes. In the example shown, an update of a Network Identification (Graph) and Network Identification (List) are provided. The Network Identification (Graph) includes recursively updated data: Datum (Entity Name): USPTO that points to Datum (Street Address): "*, Leesburg, VA 20176", Datunm (ARIN Handle): C00485*, and Datum (IP Range): 198.92.193.*-198.92.193.*. Datum (IP Range): 198.92.193.*-198.92.193.* points to Datum (Domain Name): ITWIAM*.etc.uspto.gov, which points to Datum (IP Range): 151.*.*.*-151.*.*.*. The Network Identification (Graph) includes recursively updated data: Datum (Domain Name): uspto.gov, which is pointed to from Datum (IP Range): 198.92.193.*-198.92.193.*. Datum (Domain Name): uspto.gov also points to Datum (IP Range): 151.*.*.*-151.*.*.*. Network Identification (List) table include three columns: Datum Type, Value, and Reason. The table includes nine data rows: 1) Entity Name, USPTO, Seed Data; 2) Domain Name, uspto.gov, Seed Data; 3) AKIN Handle, C00485*, Registry Suggester, Premise: "USPTO" Entity Name; 4) IP Range 198.92.193.*-198.92.193.*, Registry Suggester, Premise: "USPTO" Entity Name; 5) Street Address, "*, Leesburg, VA 20176, Registry Suggester, Premise "USPTO" Entity Name; 6) Domain Name, ITWAIM*.etc.uspto.gov, Domain suggester, Premise: IPRange 198.92.193.*-198.92.193; 7) Domain Name, uspto.gov, Domain suggester, Premise: IPRange 198.92.193.*-198.92.193; 8) IP Range, 151.*.*.*-151.*.*.*, IP Range suggester, Premise: Domain Name ITWIAM*.etc.uspto.gov; and 9) IP Range, 151.*.*.*-151.*.*.***, IP Range suggester, Premise: Domain Name uspto.gov. In some embodiments, a graph and list display assets and attributes detected associated with an input seed or detected assets or attributes. In the display shown in FIG. 14, a first, second, and third set of detected assets or attributes are indicated in the graph by the arrows and in the list by an indication in a reason column by a suggester name.

FIG. 15 is a diagram illustrating an embodiment of an example output during detection of network assets or attributes. In the example shown, three columns are shown of a recursively completed network identification (list). Columns displayed are Datum Type, Value, and Reason. Nine rows are shown including: 1) Entity Name, USPTO, Seed Data; 2) Domain Name, uspto.gov, Seed Data; 3) AKIN Handle, C00485*, Registry Suggester, Premise: "USPTO" Entity Name; 4) IP Range 198.92.193.*-198.92.193.*, Registry Suggester, Premise: "USPTO" Entity Name; 5) Street Address, "*, Leesburg, VA 20176, Registry Suggester, Premise "USPTO" Entity Name; 6) Domain Name, ITWAIM*.etc.uspto.gov, Domain suggester, Premise: IPRange 198.92.193.*-198.92.193; 7) Domain Name, uspto.gov, Domain suggester, Premise: IPRange 198.92.193.*-198.92.193; 8) IP Range, 151.*.*.*-151.*.*.*, IP Range suggester, Premise: Domain Name ITWIAM*.etc.uspto.gov; and 9) . . . , . . . , and . . . . An example output of unique IP ranges is shown: with three columns and 4 rows. Columns displayed are Datum Type, Value, and Reason. The four rows comprise the following: 1) IP Range, 198.92.193.*-198.92.193, ARIN suggester, Premise: "USPTO" Entity Name; 2) IP Range, 151.*.*.*-151.*.*.*, IP Range suggester, Premise: Domain Name ITWIAM*.etc.uspto.gov; 3) IP Range, 66.63.17.*-66.63.17.*, IP Range suggester, Premise: ARIN Customer Handle C00486***; and 4) . . . , In some embodiments, detection continues until no suggester produces new, non-redundant datum that is accepted. At that point, processing is complete and the list or graph output is then filtered. In some embodiments, filtering comprises deduplication. In some embodiments, limitation are applied to data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for detecting network assets or attributes related to a network entity, comprising:
   an input interface configured to receive a seed, wherein the seed is associated with the network entity, wherein the seed includes one or more of a network entity name or a network entity domain name, the input interface configured as architecturally external to a network wherein the network entity resides; and
   a processor configured to:
      determine a first set of network assets or attributes associated with the seed, based on an outside view of the network;
      identify a second set of network assets or attributes that are a subset of the first set of network assets or attributes based on the outside view of the network, wherein the second set of network assets or attributes includes those assets and attributes of the first set of network assets and attributes that are not included on a blacklist of network assets or attributes for the network entity and are either included in a set of expected network assets or attributes for the network entity, or have been indicated as relevant to the network entity by a user;
      iterate a subsequent set of network assets or attributes based on the second set of network attributes until a diminishing returns criterion is met, wherein each iteration uses an output of a previous iteration as input as a set of parameters in a current iteration and removes redundant attributes from the second set of network attributes; and
      update the set of expected network assets or attributes for the network entity based on the subsequent set of network assets or attributes.

2. The system of claim 1, wherein determining the first set of assets or attributes or the second set of network assets or attributes is based at least in part on an entropy reliability.

3. The system of claim 1, wherein the processor is further configured to:
   determine a security evaluation of the first set of network assets or attributes, the second set of network assets or attributes, or the subsequent set of network assets or attributes.

4. The system of claim 1, wherein the processor is further configured to:
   create a map of determined network assets or attributes, wherein the determined network assets or attributes comprise the first set of network assets or attributes, the second set of network assets or attributes, the expected set of network assets or attributes, or the updated expected set of network assets or attributes.

5. The system of claim 1, wherein the input interface is further configured to:
   receive the set of expected network assets or attributes.

6. The system of claim 5, wherein the processor is further configured to:
   compare determined network assets or attributes with the set of expected network assets or attributes, wherein the determined network assets or attributes comprise the first set of network assets or attributes or the second set of network assets or attributes.

7. The system of claim 6, wherein the processor is further configured to:
   evaluate the determined network assets or attributes based at least in part on the set of expected network assets or attributes.

8. The system of claim 1, wherein the first set of network assets or attributes or the second set of network assets or attributes are determined based at least in part on a WHOIS service.

9. The system of claim 1, wherein the first set of network assets or attributes or the second set of network assets or attributes are determined based at least in part on regional Internet registry information.

10. The system of claim 1, wherein the first set of network assets or attributes or the second set of network assets or attributes are determined based at least in part on DNS information.

11. The system of claim 1, wherein the first set of network assets or attributes or the second set of network assets or attributes are determined based at least in part on certificate information.

12. The system of claim 1, wherein the first set of network assets or attributes or the second set of network assets or attributes are determined based at least in part on cryptographic information.

13. The system of claim 1, wherein the first set of network assets or attributes or the second set of network assets or attributes are determined based at least in part on autonomous system number information.

14. The system of claim 1, wherein the first set of network assets or attributes or the second set of network assets or attributes are determined based at least in part on software version, firmware version, or hardware version information.

15. The system of claim 1, wherein the first set of network assets or attributes or the second set of network assets or attributes are determined based at least in part on unique identifying attributes of the asset's software, firmware, or hardware.

16. The system of claim 1, wherein the processor is further configured to:
    determine a relationship between a network asset of the first set of network assets or attributes or the second set of network assets or attributes and the network entity.

17. The system of claim 16, wherein the relationship comprises an "is owned by" relationship.

18. The system of claim 16, wherein the relationship comprises an "was previously owned by" relationship.

19. The system of claim 16, wherein the relationship comprises an "is operated by" relationship.

20. The system of claim 16, wherein the relationship comprises an "was previously operated by" relationship.

21. The system of claim 16, wherein the relationship comprises an "is manufactured by" relationship.

22. The system of claim 16, wherein the relationship comprises an "is maintained by" relationship.

23. The system of claim 16, wherein the relationship comprises an "was previously maintained by" relationship.

24. The system of claim 16, wherein the relationship comprises an "is operated on behalf of" relationship.

25. The system of claim 16, wherein the relationship comprises an "was previously operated on behalf of by" relationship.

26. The system of claim 16, wherein the relationship comprises an "is associated with" relationship.

27. The system of claim 16, wherein the relationship comprises an "was previously associated with" relationship.

28. The system of claim 16, wherein the relationship comprises an "has configuration parameters or software versions identical or similar to" relationship.

29. The system of claim 16, wherein the relationship comprises an "has displayed configuration parameters or software versions identical or similar to" relationship.

30. The system of claim 1, wherein the first set of network assets or attributes is determined by a network asset or attribute suggester based at least in part on the seed.

31. The system of claim 30, wherein the processor is further configured to determine a third set of network assets or attributes using the network asset or attribute suggester based at least in part on one network asset or attribute of the second set of network assets or attributes.

32. The system of claim 31, wherein the one network asset or attribute of the second set of network assets or attributes is an asset or attribute of the second set of network assets or attributes not previously included in the set of expected network assets or attributes for the network entity.

33. A method for detecting network assets or attributes related to a network entity, comprising:
    receiving a seed, by an input interface, wherein the seed is associated with the network entity, wherein the seed includes one or more of a network entity name or a network entity domain name, the input interface configured as architecturally external to a network wherein the network entity resides;
    determining, using a processor, a first set of network assets or attributes associated with the seed, based on an outside view of the network;
    identifying a second set of network assets or attributes that are a subset of the first set of network assets or attributes based on the outside view of the network, wherein the second set of network assets or attributes include those assets and attributes of the first set of attributes and assets that are not included on a blacklist of network assets or attributes for the network entity and are either included in a set of expected network assets or attributes for the network entity, or have been indicated as relevant to the network entity by a user;
    iterating a subsequent set of network assets or attributes based on the second set of network assets or attributes until a diminishing returns criterion is met, wherein each iteration uses an output of a previous iteration as input as a set of assets parameter in a current iteration and removes redundant assets or attributes from the second set of network assets or attributes; and
    updating the set of expected network assets or attributes for the network entity based on the subsequent set of network assets or attributes.

34. The method of claim 33, further comprising:
    determining a security evaluation of the first set of network assets or attributes, the second set of network assets or attributes, or the subsequent set of network assets or attributes.

35. The method of claim 33, further comprising:
    generating a map of determined network assets or attributes, wherein the determined network assets or attributes comprise the first set of network assets or attributes, the second set of network assets or attributes, the expected set of network attributes, or the updated expected set of network assets or attributes.

36. A computer program product for detecting network assets or attributes related to a network entity, the computer program product being embodied in a non-transitory computer readable storage medium and comprising computer instructions for:
    receiving a seed, by an input interface, wherein the seed is associated with the network entity, wherein the seed includes one or more of a network entity name or a network entity domain name, the input interface configured as architecturally external to a network wherein the network entity resides;
    determining, using a processor, a first set of network assets or attributes associated with the seed, based on an outside view of the network;
    identifying a second set of network assets or attributes that are a subset of the first set of network assets or attributes based on the outside view of the network, wherein the second set of network assets or attributes include those assets and attributes of the first set of attributes and assets that are not included on a blacklist of network assets or attributes for the network entity and are either included in a set of expected network assets or attributes for the network entity, or have been indicated as relevant to the network entity by a user;
    iterating a subsequent set of network assets or attributes based on the second set of network assets or attributes until a diminishing returns criterion is met, wherein each iteration uses an output of a previous iteration as input as a set of assets parameter in a current iteration and removes redundant assets or attributes from the second set of network assets or attributes; and
    updating the set of expected network assets or attributes for the network entity based on the subsequent set of network assets or attributes.

37. The computer-readable medium of claim 36, further comprising:
    determining a security evaluation of the first set of network assets or attributes, the second set of network assets or attributes, or the subsequent set of network assets or attributes.

38. The computer-readable medium of claim 36, further comprising:
    generating a map of determined network assets or attributes, wherein the determined network assets or attributes comprise the first set of network assets or attributes, the second set of network assets or attributes, the expected set of network assets or attributes, or the updated expected set of network assets or attributes.

* * * * *